(12) United States Patent
Canedo et al.

(10) Patent No.: US 8,506,315 B2
(45) Date of Patent: Aug. 13, 2013

(54) DOCKING STATION FOR CONNECTOR FOR ELECTRIC VEHICLE CHARGING STATION

(75) Inventors: Jose Filiberto Escamilla Canedo, Nuevo Leon (MX); Vladimir Cano Rodriguez, Nuevo Leon (MX); Jorge Vladimir Silva Mata, Nuevo Leon (MX); Karla Morena Guajardo Gonzalez, Nuevo Leon (MX)

(73) Assignee: Schneider Electric USA, Inc., Palatine, IL (US)

( * ) Notice: Subject to any disclaimer, the term of this patent is extended or adjusted under 35 U.S.C. 154(b) by 0 days.

(21) Appl. No.: 13/298,656

(22) Filed: Nov. 17, 2011

(65) Prior Publication Data
US 2013/0130532 A1   May 23, 2013

(51) Int. Cl.
*H01R 13/62*  (2006.01)
(52) U.S. Cl.
USPC ............................ 439/310; 439/372; 439/352
(58) Field of Classification Search
USPC .......................................... 439/310, 372, 352
See application file for complete search history.

(56) References Cited

U.S. PATENT DOCUMENTS

| 3,041,420 | A | | 6/1962 | Berry et al. | |
|---|---|---|---|---|---|
| 4,553,000 | A | | 11/1985 | Appleton | |
| 4,611,729 | A | | 9/1986 | Gerstenmaier et al. | |
| 5,350,312 | A | * | 9/1994 | Kuno et al. | 439/310 |
| 5,674,086 | A | * | 10/1997 | Hashizawa et al. | 439/310 |
| 6,123,569 | A | * | 9/2000 | Fukushima et al. | 439/456 |
| 7,455,544 | B2 | * | 11/2008 | Glauning et al. | 439/352 |
| 7,688,024 | B2 | | 3/2010 | Kamaga | |
| 7,963,793 | B2 | * | 6/2011 | Poulin et al. | 439/352 |
| 8,025,526 | B1 | * | 9/2011 | Tormey et al. | 439/528 |
| 8,206,171 | B2 | * | 6/2012 | Osawa et al. | 439/352 |
| 2011/0037429 | A1 | | 2/2011 | DeBoer et al. | |
| 2011/0171850 | A1 | | 7/2011 | Brown, II | |

\* cited by examiner

*Primary Examiner* — Gary F. Paumen
(74) *Attorney, Agent, or Firm* — Nixon Peabody LLP

(57) ABSTRACT

A docking station for stowing an electrical connector adapted to connect a power source to a re-chargeable battery in a vehicle powered at least partially by the battery. The connector has a first end connected to a power cable for coupling the connector to the power source, and a second end that includes multiple first electrical terminals adapted to engage mating second electrical terminals in a receptacle. The second end also includes a protruding latching element adapted to engage a cooperating latching element in a receptacle for latching the connector to the receptacle. A stowing receptacle adapted to receive the second end of the connector when the connector is not in use includes an elongated recess adapted to receive the protruding latching element when the protruding latching element is located anywhere along the length of the elongated recess.

12 Claims, 4 Drawing Sheets

FIG. 1A　　　　FIG. 1B

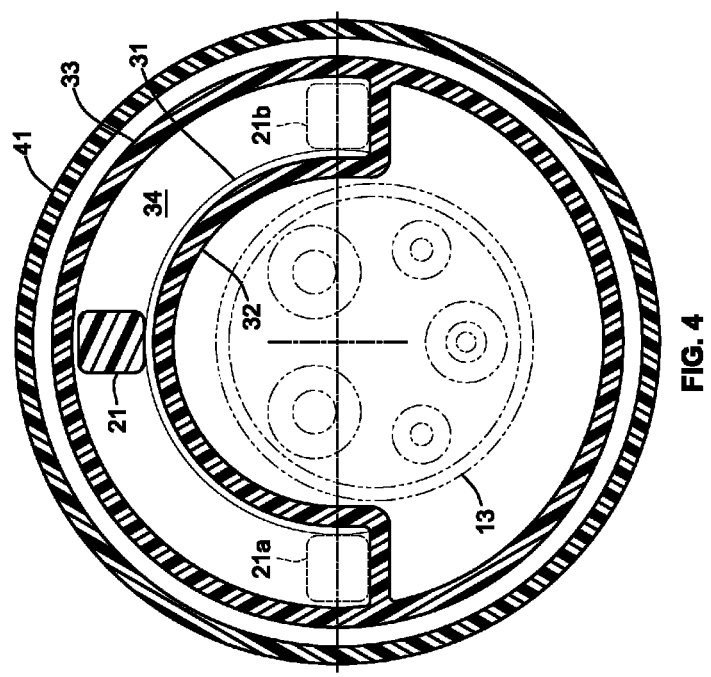
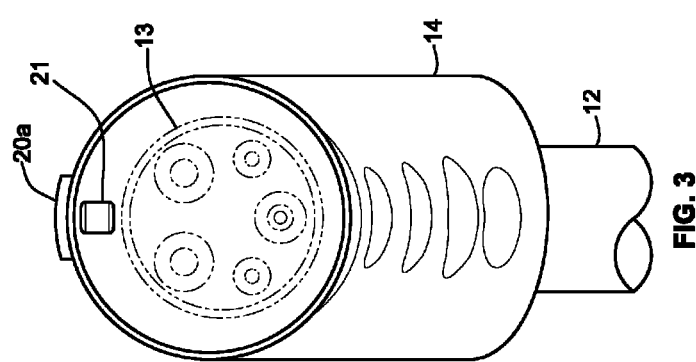
FIG. 4
FIG. 3

DOCKING STATION FOR CONNECTOR FOR ELECTRIC VEHICLE CHARGING STATION

FIELD OF THE INVENTION

The present invention relates generally to electric vehicle charging stations (EVCSs), also referred to as electric vehicle supply equipment (EVSE), and, more particularly, to a docking station for use in an EVCS to stow the electrical connector used to charge the re-chargeable batteries in electric vehicles, when the connector is not in use.

BACKGROUND OF THE INVENTION

In the United States, the current standard for the "conductive charge coupler" used to connect an electrical power source to the electrical system of an electric is vehicle, to charge the vehicle battery, is the SAE J1772 standard. This standard applies to both the electrical inlet in the vehicle and the connector used to couple an electrical charging system to the vehicle inlet. The purpose of the coupler is to transfer energy to charge the battery and operate other vehicle electrical systems, to establish a reliable equipment grounding path, and to exchange control information between the vehicle and the supply equipment. The vehicle is typically equipped with an on-board charger capable of accepting energy from a single-phase AC supply network, converting the AC to DC, and regulating the supply voltage to a level that permits a managed charge rate based on the battery charge acceptance characteristics.

The J1772 connector and vehicle inlet include mating sets of electromechanical contacts that provide a physical connection at the vehicle interface for the power conductors, an equipment grounding conductor, a control pilot conductor, and a proximity sense conductor to provide a signal that helps reduce electrical arcing of the coupler during disconnect. Thus, the interface typically has five contacts that perform the interface functions. In addition, the coupler includes a latching mechanism to prevent inadvertent or accidental decoupling. The latching mechanism may also serve to properly align the connector with the vehicle inlet by requiring a latch element projecting from the connector to be registered with a cooperating latch element in the vehicle inlet.

An EVCS typically includes a docking station for stowing the electrical connector on the power cord when the connector is not being used. The mechanical receptacle for the connector on the end of the power cord is usually similar to the electrical receptacle in an electric vehicle, but without the electrical terminals. Because of the heavy gage of the power cord, it can be difficult for a user to properly align the connector with the stowing receptacle while attempting to dock the connector on the power cord. Thus, there is a need for an improved EVCS docking station that io facilitates the docking of the electrical connector when it is not in use.

SUMMARY OF THE INVENTION

When the J1772 connector is being stowed in an EVCS, the first physical contact typically occurs at the front end of the latching element that projects is from the connector. If this latching element is not properly aligned with its mating recess and latching element in the docking receptacle, it can become awkward for the user to manipulate the connector to the requisite position. The present invention alleviates this problem by significantly extending the latching element in the docking receptacle, while maintaining its latching function regardless of where it is first engaged by the latching element of the connector.

In accordance with one embodiment, the docking station is provided with an elongated latching recess adapted to receive and engage the projecting latching element of the connector anywhere along the length of the elongated recess. Thus, the connector can be successfully stowed as long as its latching element is located within the region defined by the extended length of the latching recess within the stowing receptacle.

In one implementation, the elongated latching recess in the stowing receptacle is an arched recess, e.g., extending along a 180-degree arc, in the upper portion of the stowing receptacle. A latching flange extends along the entire length of the elongated latching recess, so that the connector becomes latched to the docking station regardless of where the connector latching element first enters the latching recess. Thus, the cooperating latch elements latch the connector to the stowing receptacle as soon as the connector is pushed into the stowing receptacle.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The invention may best be understood by reference to the following io description taken in conjunction with the accompanying drawing, in which:

FIG. 3 is an enlarged end elevation taken from the right-hand end of the electrical connector on the end of the power cord as depicted in FIG. 2.

FIG. 4 is an enlarged section taken along line 4-4 in FIG. 2.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
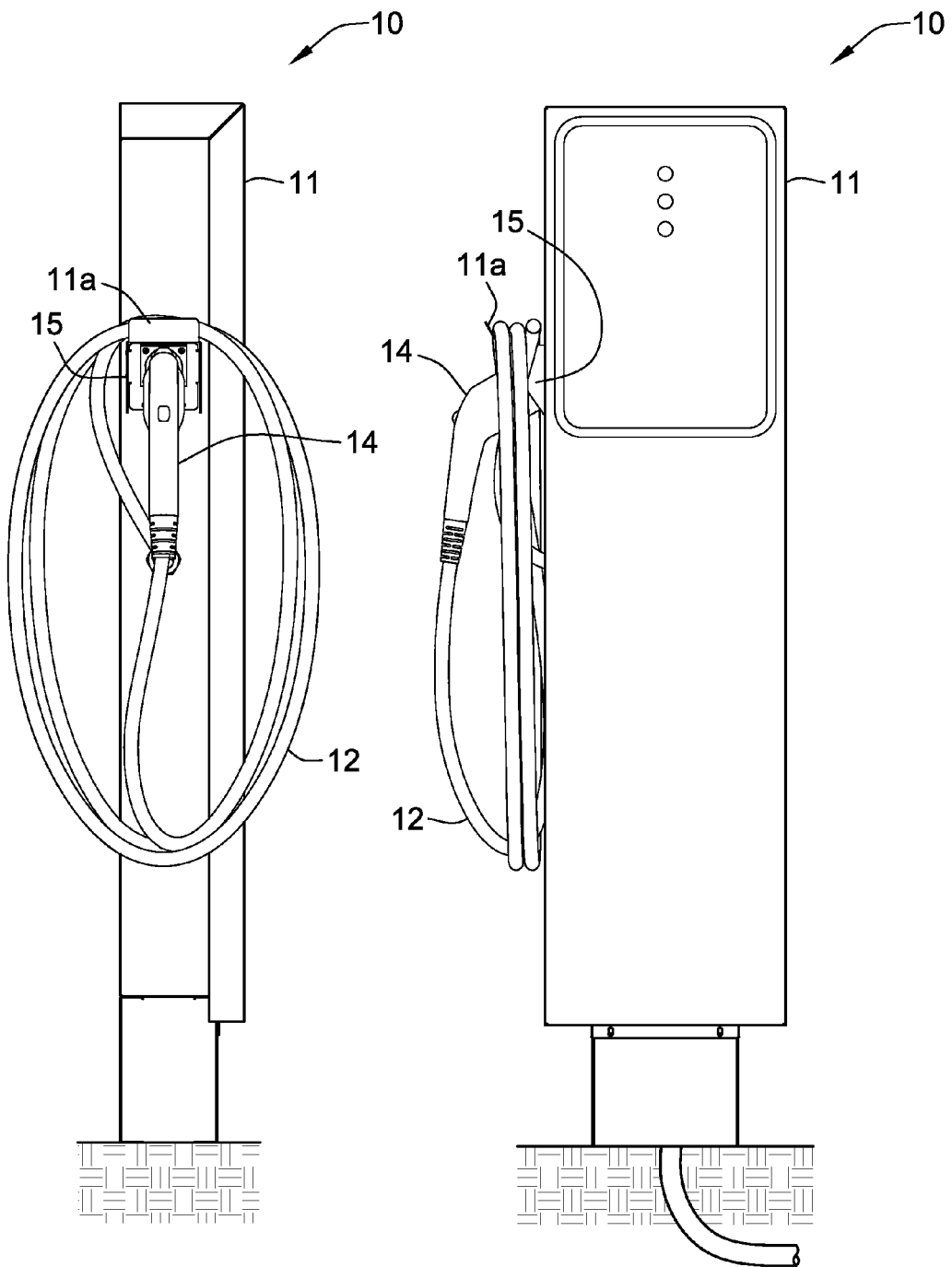
FIGS. 1A and 1B are front and side elevations, respectively, of a pedestal-type charging station for electric vehicles, with the pedestal including a docking station for the electrical connector on the end of the power cord to be attached to an electric vehicle.

Turning now to the drawings, FIGS. 1A and 1B illustrate an electric vehicle charging station (EVCS) 10 that includes a pedestal 11 connected to an electrical power source such as the local electric utility grid. Electric vehicles are primarily powered by electric motors that draw from a rechargeable energy storage device such as a battery, as well as exchanging information. The vehicle typically has an electrical receptacle for receiving an electrical connector coupled to an electrical power supply for charging one or more batteries in the vehicle. As used herein, the term "electric vehicle" includes both vehicles that use only electrical power and hybrid vehicles in which the power train uses both an electrical power source and an internal combustion engine.

Within the pedestal 11, the electrical power source is connected to one end of a power cable 12 via conventional safety devices such as a circuit breaker or fuse. The other end of the power cable 12 is connected to a first end of an electrical connector 13 (see FIG. 2) within a handle 14, to facilitate coupling the connector 13 to a power source such as an electrical distribution utility grid. The second end of the connector 13 is includes multiple first electrical terminals that are adapted to engage mating second electrical terminals in the vehicle inlet, i.e., the electrical receptacle that is standard equipment in electric vehicles. As mentioned above, the current standard for electrical connectors for charging electric vehicles in the United States is the SAE J1772 standard, for both the male and female electrical terminals used to connect the battery in an electric vehicle to an EVCS to re-charge the vehicle battery. The J1772 connectors include three detachable conductors for connecting and disconnecting the positive, negative and neutral lines of the electrical power source to the positive and negative terminals of the vehicle battery, and a vehicle ground terminal. The battery then receives and stores electrical power for future use by the vehicle.

When the charging station 10 is not in use, the power cable 12 from the pedestal 11 is looped around a bracket 11a on the pedestal 11, and the connector 13 is inserted into a docking station 15 on the pedestal 11. The docking station 15 does not include any electrical connectors, but provides physical support and protection for the connector 13 when it is not in use. The docking station 15 is located at a preselected elevation on the pedestal 11 that is convenient for all users of the charging station 10.

As can be seen in FIGS. 2 through 5, a protruding latching element 20 is formed by a finger that projects from the top of the connector 13 for holding the connector 13 onto a mating vehicle receptacle to prevent inadvertent or accidental decoupling. The protruding latching element 20 also serves to properly align the connector 13 with the vehicle receptacle so that the multiple conductors in the connector 13 properly register with the corresponding conductors in the vehicle receptacle. The vehicle receptacle receives the latching element 20 in a tapered socket that serves as a lead-in for automatic alignment during insertion of the connector. The latching element 20 can enter its socket in the vehicle receptacle only when the connector 13 is in the io proper angular position where the conductors in the connector are aligned with their mating conductors in the vehicle receptacle. When the latching element 20 engages a cooperating latching element in the vehicle receptacle, the latching engagement provides tactile and audible feedback to the user.

Figure 2:
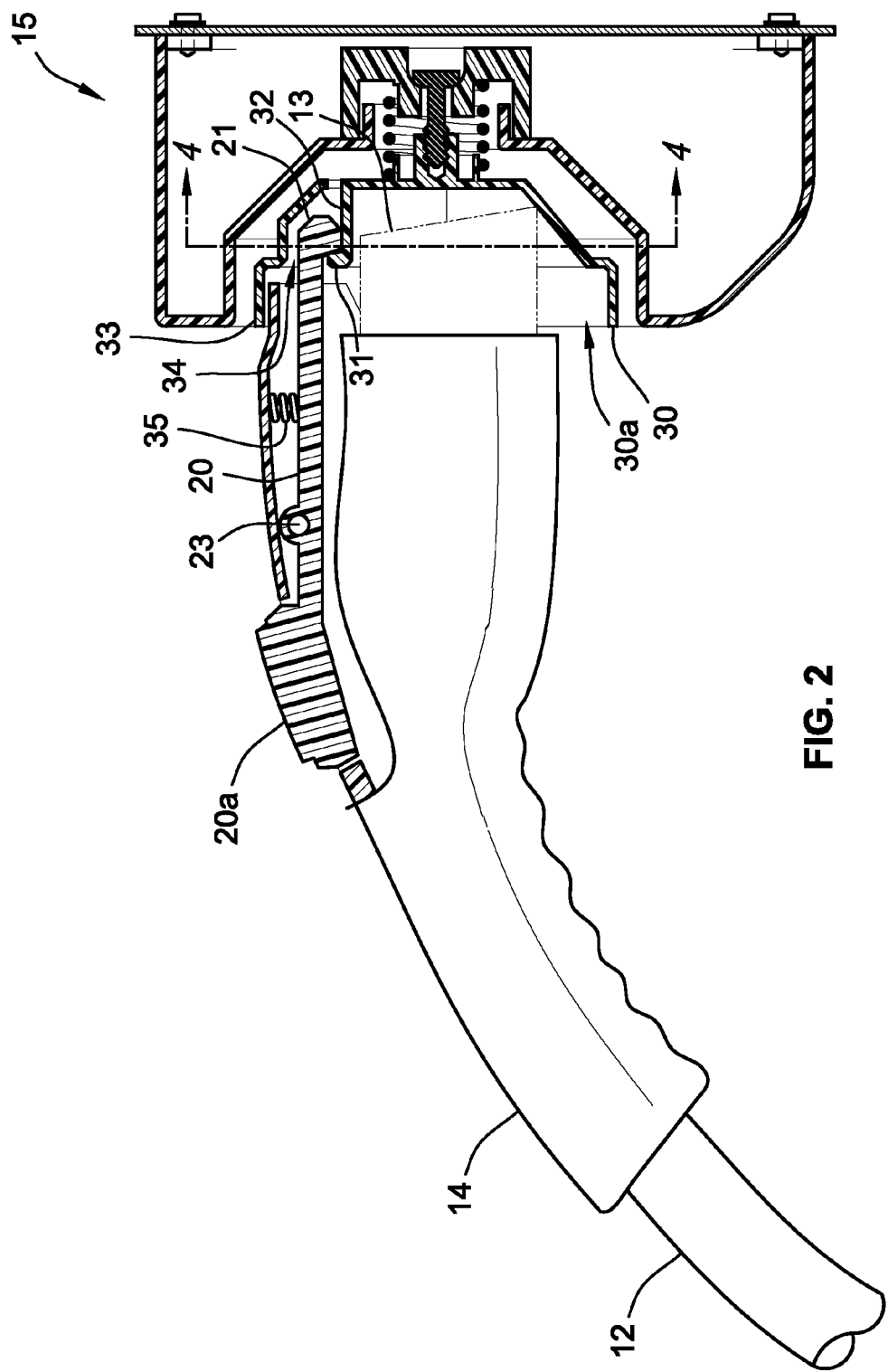
FIG. 2 is an enlarged side elevation of the electrical connector on the power cord stowed in the docking station on the pedestal shown in FIGS. 1A and 1B, and with the mating portions of the connector and the docking station shown in section, with the latching elements in their latched positions.
Figure 5:
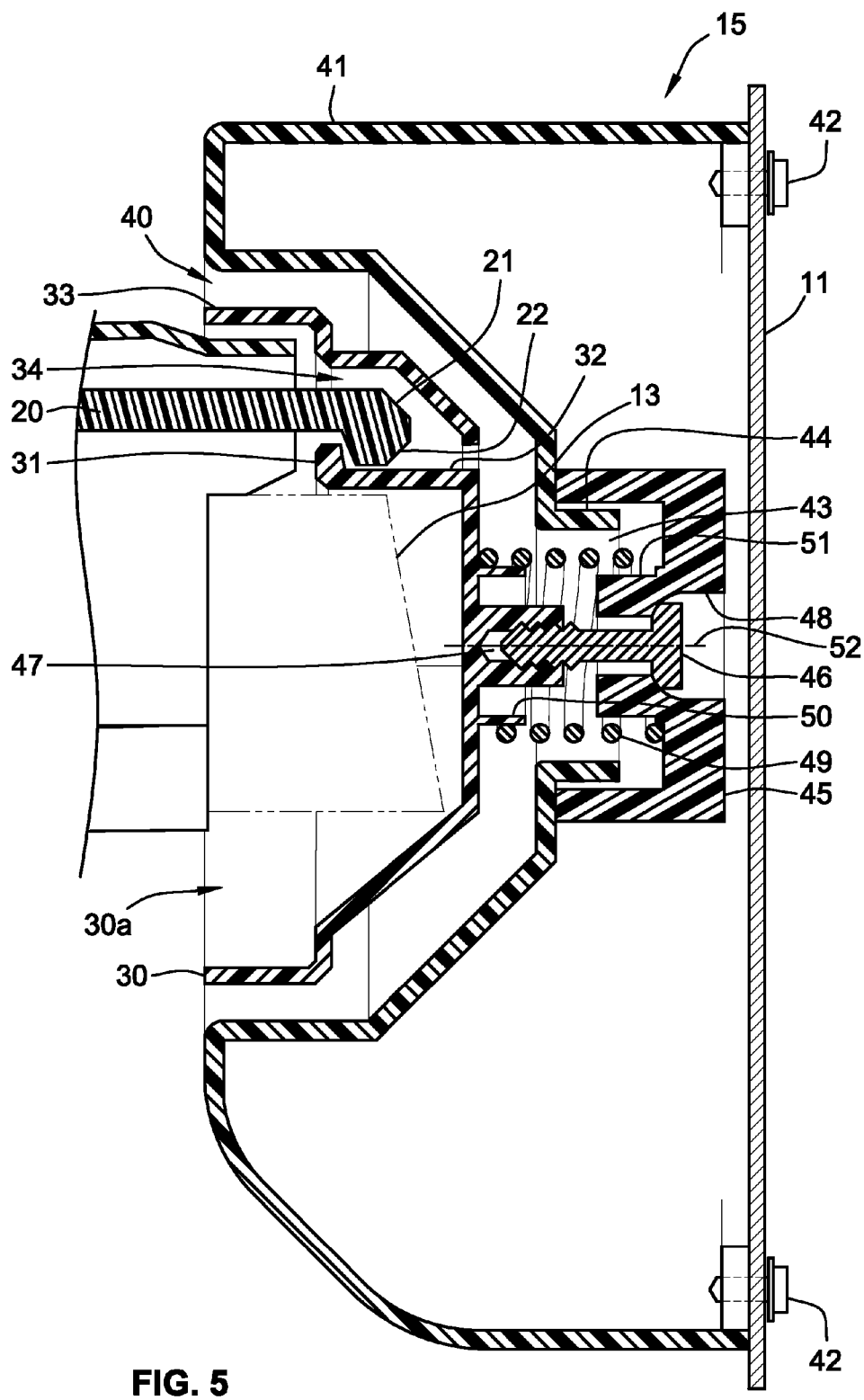
FIG. 5 is a further enlarged version of the right-hand portion of the side elevation of FIG. 2.

As can be seen in FIGS. 2 and 5, the latching element 20 projecting is from the top of the connector 13 is used to retain the connector in a stowing receptacle 30 that is part of the docking station 15. As the latching element 20 is pushed into the receptacle 30, a depending flange 21 on the front end of the latching element 20 snaps over a flange 31 projecting radially outwardly from a semi-circular rib 32 such that the flange 31 is on an outer end of the semi-circular rib 32 which is an inner side wall of a recess 34 that is part of the receptacle 30. As can be seen in FIG. 4, the flanged rib 32, which is the latching element of the receptacle 30, extends around the top 180 degrees of the central portion of the receptacle 30, forming a 180-degree arch.

In cooperation with the outer wall 33 of the receptacle 30, the rib 32 also forms an elongated semicircular recess 34 so that the connector latching element 20 can be received by the receptacle 30 at any angular position falling within the 180-degree arch formed by the semicircular recess 34, i.e., anywhere within the region encompassed by the opening of the elongated recess 34. Thus, it is not necessary for the user to position the connector 13 so that the latching element 20 is located at the uppermost portion of the receptacle 30, thus greatly simplifying the docking operation.

As can be seen in FIGS. 2 and 5, the outer wall 33 of the receptacle 30 forms a relatively large entry opening 30a, and then tapers inwardly to guide the projecting latching element 20 of the connector 13 inwardly toward the semicircular recess 34. When the front end of the latching element 20 engages the flange 31 of the rib 32 in the receptacle 30, a tapered lower surface 22 on the front of the latch flange 21 cams the forward end of the latching element 20 upwardly (as viewed in FIGS. 2 and 5), against the urging of a biasing spring 35 (see FIG. 2), so that the forward end of the latching element 20 passes over the flange 31. The spring 35 then causes the forward end of the latching element 20 to snap back against the outer surface of the rib 32, after the flange 21 clears the flange 31. The overlapping flanges 21 and 31 then latch the connector 13 to the docking station 15.

If the connector latching element 20 is located off-center in the arched recess 34, such as one of the locations 21a and 21b illustrated in FIG. 4, the handle 14 will be tilted rather than hanging straight vertically. Thus, the weight of the power cable 12 pulling on the lower end of the handle 14 will apply a torque to the handle 14, urging the handle toward a straight vertical position. The latching flanges 21 and 31 is accommodate such movement of the handle 14 by permitting the flange 21 to slide along the outer surface of the rib 32 behind the flange 31, thus holding the handle 14 latched to the stowing receptacle 30. The latching flange 31 extends along the entire length of the rib 32, so that latching of the two flanges 21 and 31 can be initiated at any point along the length of the recess 34

The latching element 20 is pivoted on a shaft 23 (see FIG. 2) so that the front end of the latching element 20 can be pivoted upwardly by pushing down on an actuator button 20a formed as an integral part of the trailing end portion of the latching element 20. The button 20a protrudes out through a hole in the top wall of the handle 14 so that the button 20a is accessible from the exterior of the handle 14 so that a user can manually press the button 20a to release the latch when it is desired to remove the handle 14 from the receptacle 30 (when releasing the connector from a vehicle inlet, the actuator button 20a may also open a switch to trigger a vehicle charge control to provide controlled shutoff of charge power prior to disconnection). Pressing the actuator button 20a tilts the front end of the latching element 20 upwardly against the biasing force of the spring 35 so that the flange 21 clears the latching flange 31 of the stowing receptacle 30, thereby allowing the handle 14 and the connector 13 to be removed from the stowing receptacle.

Referring to FIGS. 2 and 5, the stowing receptacle 30 is nested within a cavity 40 formed by a housing 41 attached to the pedestal 11 by multiple screws 42. The rear surface of the cavity 40 forms a central opening 43 surrounded by a circular flange 44 that receives a base 45. A screw 46 extends through a central hole in the base 45 and is threaded into a hub 47 projecting from the rear surface of the receptacle 30. This captures the receptacle 30 within the cavity 40 while still allowing limited axial movement of the receptacle 30 relative to the walls of the cavity 40 because the head of the screw 46 can move axially within its recess 48 in the rear surface of the base 45. A coil spring 49 fits over matching hubs 50 and 51 formed by the receptacle 30 and the base 45, respectively, and biases the receptacle 30 to the advanced position illustrated in FIGS. 2 and 5, where the head of the screw 46 engages the bottom of its recess 48. When pressure is applied to the receptacle 30 urging it further into the cavity, as occurs when is the connector 13 is being stowed in the receptacle 30, the receptacle 30 can move inwardly against the biasing force of the spring 49, so that the receptacle can yield to such pressure, until the receptacle 30 engages the wall of the cavity 40. The receptacle 30 can also tilt slightly within the cavity 40, again until the receptacle 30 engages the wall of the cavity 40. This provides a soft feel to a user attempting to stow the connector 13 in the receptacle 30, and avoids a sharp impact or vibration as the connector 13 reaches its fully stowed position.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A docking station for stowing an electrical connector adapted to connect a power source to a re-chargeable battery in a vehicle powered at least partially by said battery, said connector having a first end connected to a power cable for coupling said connector to said power source, and a second end that includes multiple first electrical terminals adapted to engage mating electrical terminals in an electrical receptacle in said vehicle, said second end also including a protruding latching element adapted to engage a cooperating latching element in said receptacle for latching said connector to said receptacle, said docking station comprising
a stowing receptacle adapted to receive said second end of said connector when said connector is not in use, said stowing receptacle including an elongated recess adapted to receive said protruding latching element when said protruding latching element is located anywhere within the region encompassed by the elongated recess, said recess including said cooperating latching element, and said cooperating latching element extends along the entire length of the recess.

2. The docking station of claim 1 in which said recess is an arched recess in the upper portion of said stowing receptacle.

3. The docking station of claim 1 in which said protruding latching element is urged to the uppermost portion of said arched recess when said connector is inserted into said stowing receptacle with said protruding latching element located below the top of said arched recess.

4. The docking station of claim 2 in which said arched recess extends about 180 degrees around a central portion of said stowing receptacle.

5. The docking station of claim 1 in which said protruding latching element and said recess form cooperating surfaces that latch said connector to said stowing receptacle when said connector is pushed into said stowing receptacle.

6. The docking station of claim 1 in which said protruding latching element is a finger having a leading end forming a first flange, and said latching element of said stowing receptacle is a second flange on an outer end of an inner side wall of said recess for engaging said first flange when said connector is inserted into said stowing receptacle, at least one of the engaging surfaces of said first and second flanges being tapered to cam said first flange away from said second flange in response to a force urging said first flange against said second flange when said connector is pushed into said stowing receptacle.

7. The docking station of claim 1 in which said protruding latching element is pivotably mounted so that the leading end of said protruding latching element can be pivoted toward and away from said cooperating latching element.

8. The docking station of claim 7 which includes a biasing element urging the leading end of said protruding latching element toward said cooperating latching element.

9. The docking station of claim 8 which includes a handle housing said connector, and a manually operable actuator accessible from the exterior of said handle for pressing on the trailing end of said protruding latching element to overcome the urging of said biasing element and move the leading end of said protruding latching element away from said cooperating latching element.

10. The docking station of claim 1 which includes a pedestal supporting said storing receptacle at a preselected elevation.

11. A docking station for stowing an electrical connector adapted to connect a power source to a re-chargeable battery in a vehicle powered at least partially by said battery, said connector having a first end connected to a power cable for coupling said connector to said power source, and a second end that includes multiple first electrical terminals adapted to engage mating electrical terminals in an electrical receptacle in said vehicle, said second end also including a protruding latching element adapted to engage a cooperating latching element in said receptacle for latching said connector to said receptacle, said docking station comprising
a stowing receptacle adapted to receive said second end of said connector when said connector is not in use, said stowing receptacle including an elongated recess adapted to receive said protruding latching element when said protruding latching element is located off-center in said elongated recess anywhere within the region encompassed by the elongated recess, said recess including said cooperating latching element, and said cooperating latching element extends along the length of the recess.

12. A docking station for stowing an electrical connector adapted to connect a power source to a re-chargeable battery in a vehicle powered at least partially by said battery, said connector having a first end connected to a power cable for coupling said connector to said power source, and a second end that includes multiple first electrical terminals adapted to engage mating electrical terminals in an electrical receptacle in said vehicle, said second end also including a protruding latching element adapted to engage a cooperating latching element in said receptacle for latching said connector to said receptacle, said docking station comprising
a stowing receptacle adapted to receive said second end of said connector when said connector is not in use, said stowing receptacle including an elongated arched recess adapted to receive said protruding latching element when said handle is tilted laterally rather than straight vertically and said protruding latching element is located anywhere within the region encompassed by the elongated recess, said recess including said cooperating latching element, and said cooperating latching element extends along the length of the recess.

* * * * *